US009219887B2

(12) United States Patent
Iga et al.

(10) Patent No.: US 9,219,887 B2
(45) Date of Patent: Dec. 22, 2015

(54) DRIVE ASSIST DEVICE

(75) Inventors: Haruka Iga, Anjo (JP); Yu Tanaka, Nagoya (JP)

(73) Assignee: AISIN SEIKI KABUSHIKI KAISHA, Aichi (JP)

( * ) Notice: Subject to any disclaimer, the term of this patent is extended or adjusted under 35 U.S.C. 154(b) by 391 days.

(21) Appl. No.: 13/810,926

(22) PCT Filed: Sep. 1, 2011

(86) PCT No.: PCT/JP2011/069890
§ 371 (c)(1),
(2), (4) Date: Jan. 18, 2013

(87) PCT Pub. No.: WO2012/039256
PCT Pub. Date: Mar. 29, 2012

(65) Prior Publication Data
US 2013/0120578 A1 May 16, 2013

(30) Foreign Application Priority Data

Sep. 21, 2010 (JP) ................................. 2010-210820

(51) Int. Cl.
*H04N 7/18* (2006.01)
*B60R 1/00* (2006.01)
*B62D 15/02* (2006.01)

(52) U.S. Cl.
CPC .. *H04N 7/18* (2013.01); *B60R 1/00* (2013.01); *B62D 15/0275* (2013.01); *B62D 15/0295* (2013.01); *B60R 2300/607* (2013.01); *B60R 2300/806* (2013.01)

(58) Field of Classification Search
CPC .. B60R 1/00; B62D 15/0275; B62D 15/0295; H04N 7/18
See application file for complete search history.

(56) References Cited

U.S. PATENT DOCUMENTS 6,344,805 B1 * 2/2002 Yasui et al. ................ 340/932.2
7,161,616 B1    1/2007 Okamoto et al.
(Continued)

FOREIGN PATENT DOCUMENTS

EP    1 050 866 A1    11/2000
EP    1 170 172 A2    1/2002
(Continued)

OTHER PUBLICATIONS

International Search Report for PCT/JP2011/069890 dated Nov. 8, 2011.
(Continued)

*Primary Examiner* — Jefferey Harold
*Assistant Examiner* — Sean Haiem
(74) *Attorney, Agent, or Firm* — Sughrue Mion, PLLC

(57) ABSTRACT

A drive assist device includes: a overhead image generating unit that generates a vehicle periphery overhead image; a forward trajectory setting unit that sets a forward trajectory serving as an expected trajectory in the travel direction of the vehicle occurring when the turning based on a calculated steering angle; a reverse trajectory setting unit that sets a reverse trajectory serving as an expected trajectory in the travel direction of the vehicle or in the opposite direction as the travel direction of the vehicle occurring when turning based on a steering angle in the opposite direction as the calculated steering angle; and a image synthesizing unit that generates a drive assist overhead image for display in a monitor by synthesizing the forward trajectory and the reverse trajectory with the vehicle periphery overhead image.

8 Claims, 8 Drawing Sheets

(56) References Cited

U.S. PATENT DOCUMENTS

| | | | |
|---|---|---|---|
| 2003/0080877 A1 | 5/2003 | Takagi et al. | |
| 2007/0010918 A1* | 1/2007 | Shimazaki et al. | 701/1 |
| 2007/0299572 A1* | 12/2007 | Okamoto et al. | 701/28 |
| 2008/0174452 A1* | 7/2008 | Yamamoto et al. | 340/932.2 |
| 2010/0019934 A1 | 1/2010 | Takano | |
| 2010/0066825 A1* | 3/2010 | Kuboyama et al. | 348/118 |
| 2010/0066833 A1* | 3/2010 | Ohshima et al. | 348/148 |
| 2010/0070139 A1* | 3/2010 | Ohshima et al. | 701/42 |

FOREIGN PATENT DOCUMENTS

| | | |
|---|---|---|
| EP | 1 502 815 A1 | 2/2005 |
| JP | 2002-19492 A | 1/2002 |
| JP | 2003-137051 A | 5/2003 |
| JP | 2004-252837 A | 9/2004 |
| JP | 2005-47495 A | 2/2005 |
| JP | 2006-27334 A | 2/2006 |
| JP | 2010-12836 A | 1/2010 |
| JP | 2010-69916 A | 4/2010 |
| WO | 2009/0144893 A1 | 12/2009 |

OTHER PUBLICATIONS

Extended European Search Report, dated Mar. 27, 2014, issued in counterpart European Patent Application No. 11826702.0.

English Translation of International Preliminary Report on Patentability for PCT/JP2011/069890 dated Apr. 25, 2013.

* cited by examiner

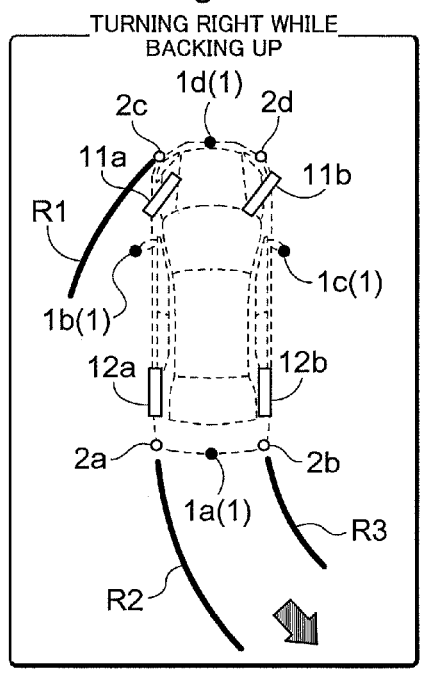
Fig.3A TURNING RIGHT WHILE BACKING UP
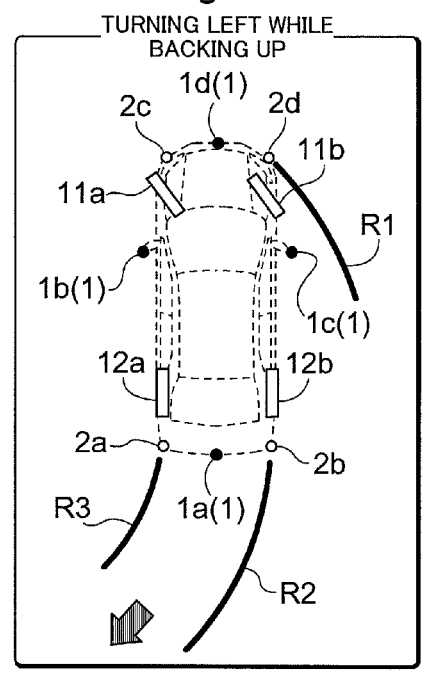
Fig.3B TURNING LEFT WHILE BACKING UP
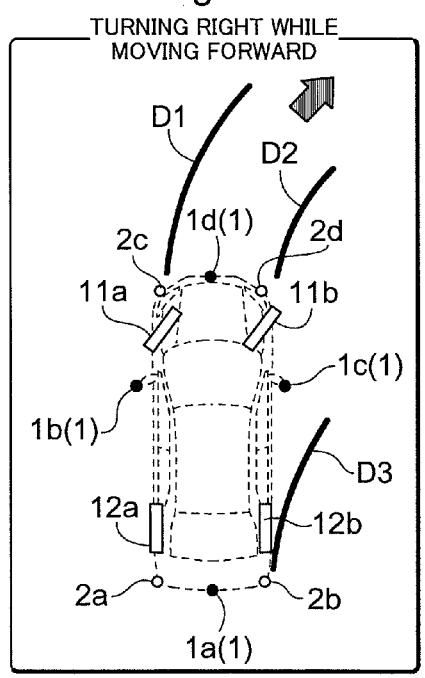
Fig.3C TURNING RIGHT WHILE MOVING FORWARD
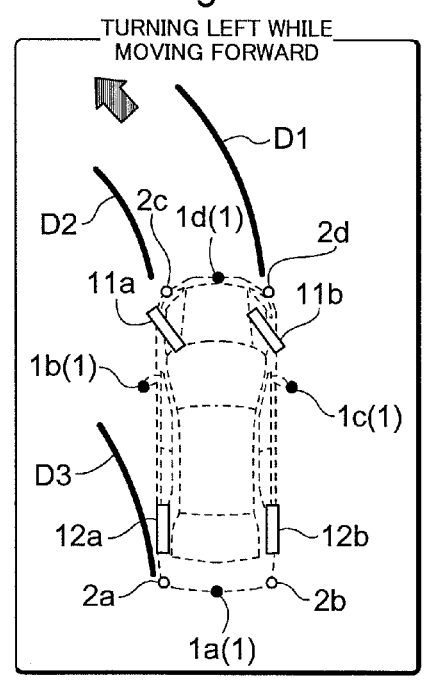
Fig.3D TURNING LEFT WHILE MOVING FORWARD

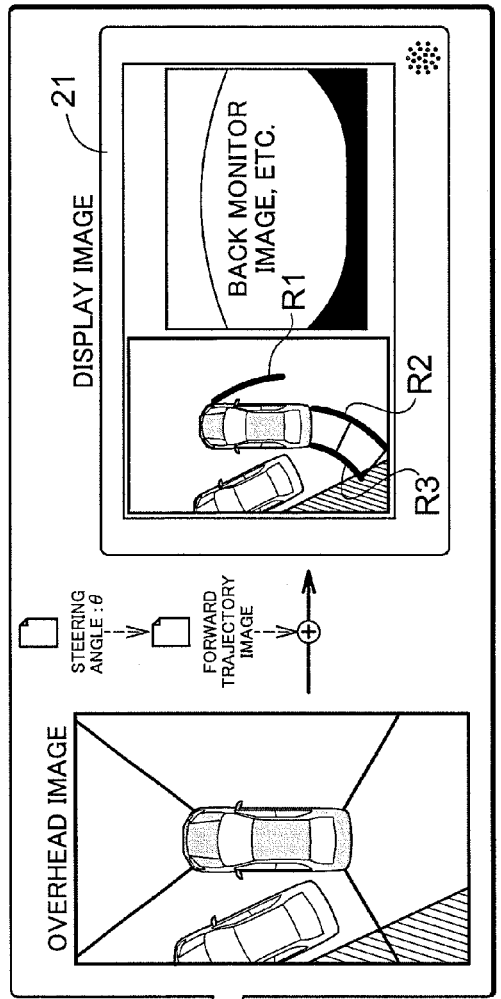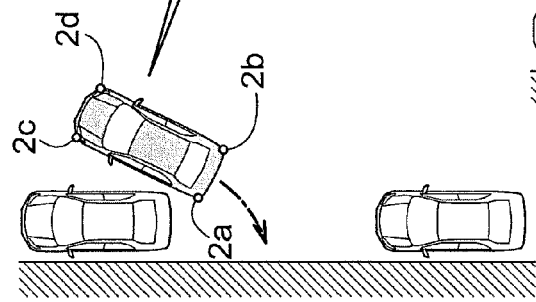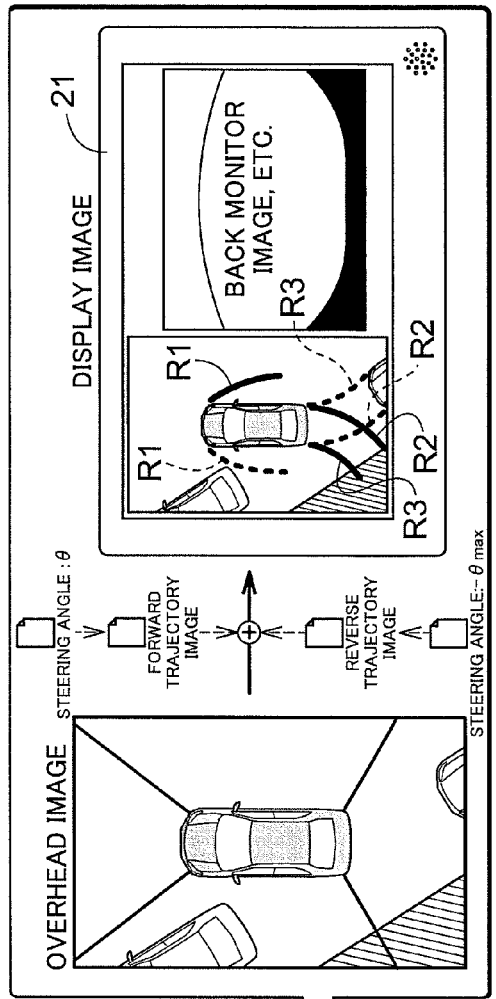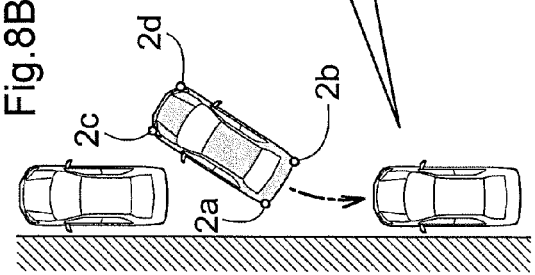

DRIVE ASSIST DEVICE

CROSS REFERENCE TO RELATED APPLICATIONS

This application is a National Stage of International Application No. PCT/JP2011/069890filed Sep. 1, 2011, claiming priority based on Japanese Patent Application No. 2010-210820 filed Sep. 21, 2010, the contents of all of which are incorporated herein by reference in their entirety.

TECHNICAL FIELD

The present invention relates to drive assistance when turning in areas where there is a high likelihood of contact with an obstruction, such as in a parking lot.

BACKGROUND ART

Patent Document 1 discloses a drive assist device that guides a parking operation when attempting to parallel park in a parking space aligned with an access road or when attempting to park perpendicularly. With this drive assist device, the vehicle periphery is captured by cameras installed in multiple positions on the vehicle, an overhead image is created by converting and synthesizing the captured image signals into an image signal whose point of view takes the camera optical axis as perpendicular to the road surface, a guidance indicator is set based on the current position of the vehicle in the overhead image, a superimposed image in which the guidance indicator is overlaid on the overhead image is created, and the superimposed image is displayed in a display means. At this time, a front outermost edge guidance indicator, a rear outermost edge guidance indicator, and a rear innermost edge guidance indicator are presented as guidance indicators for backing into a perpendicular parking space. The front outermost edge guidance indicator is a fan shape whose outer edge is an arc corresponding to ¼ of a turning circle trajectory, whose center is the turning center point of the vehicle and that passes through the left-front end of the vehicle body. The rear outermost edge guidance indicator is a fan shape whose outer edge is an arc corresponding to ¼ of a turning circle trajectory, whose center is the same turning center point and that passes through the rear end portion of the vehicle. The rear innermost edge guidance indicator is an arc corresponding to ¼ the turning circle trajectory whose center is the same turning center point and that passes through both end portion of the vehicle. In this manner, setting the trajectories of the end portion of the vehicle body as guidance indicators based on the current position of the vehicle in the overhead image and displaying those indicators superimposed over the overhead image in a monitor is intended to enable the driver to easily understand a position of entry into the parking space. However, in this drive assist device, the trajectories of the vehicle end portion that serve as the guidance indicators are based on the minimum rotation (turning) radius of the vehicle, and thus the device is not suited for assisting driving when switching the steering angle from one direction to the steering angle in the opposite direction. Furthermore, guidance indicators based on the minimum rotation radius are difficult to use during driving in which the steering angle is changed frequently, such as a head-in parking process in which the vehicle advances into the parking space while traveling forward, a parking space departure process in which the vehicle advances out of a parking space on either side of which vehicles are parked, and so on where a relaxed steering angle with a large turning radius is used in the first half of the process.

PRIOR ART DOCUMENTS

Patent Document

Patent Document 1: JP 2010-12836A (paragraphs 0005-0073; FIG. 1; FIG. 3)

DISCLOSURE OF THE INVENTION

In light of the aforementioned circumstances, what is needed is a drive assist device suitable for preventing contact with other vehicles, obstructions, and so on when switching from a steering angle in one direction to a steering angle in the opposite direction while driving.

To achieve the stated object, a drive assist device according to the present invention includes: an overhead image generating unit that generates a vehicle periphery overhead image as a display image of the periphery of a vehicle displayed in a monitor, by performing viewpoint conversion from a captured image obtained by a camera that captures the periphery of the vehicle; a steering angle calculation unit that calculates a steering angle of the vehicle; a forward trajectory setting unit that sets a forward trajectory serving as an expected trajectory in the travel direction of the vehicle when turning based on the calculated steering angle calculated by the steering angle calculation unit; a reverse trajectory setting unit that sets a reverse trajectory serving as an expected trajectory in the travel direction of the vehicle or the opposite direction as the travel direction of the vehicle when turning based on a steering angle in the opposite direction as the calculated steering angle; and an image synthesizing unit that generates a drive assist overhead image for display in a monitor by synthesizing the forward trajectory and the reverse trajectory with the vehicle periphery overhead image, so that a vehicle image in the vehicle periphery overhead image serves as a departure point.

According to this configuration, when, for example, traveling while performing steering operations and turning in order to park in a parking space or exit from a parking space where there is little space, a drive assist overhead image, which is updated based on captured images obtained during that travel and a calculated steering angle, is displayed in a monitor. At this time, a reverse trajectory that is the expected trajectory in the travel direction of the vehicle or the opposite direction as the travel direction of the vehicle occurring when the steering angle corresponds to the opposite direction as the calculated steering angle is added to the drive assist overhead image, in addition to the forward trajectory that is the expected trajectory in the travel direction of the vehicle. Through this, in the case where a problem has occurred in the travel due to an obstruction approaching or the like while turning and traveling in one direction, the driver can easily determine whether or not it is possible to avoid the problem at a steering angle in the opposite direction based on the reverse trajectory.

It is preferable, in consideration of typical circumstances in which the driving direction is changed, for the magnitude of the stated steering angle in the opposite direction to essentially be the maximum steering angle. However, this maximum steering angle includes not only the maximum steering angle characteristic to the vehicle but also the maximum steering angle that can be performed by the driver, and thus also includes magnitudes that are in the vicinity of the maximum steering angle.

In particular, during reverse parallel parking, in which same-direction reverse-steering travel that switches the steering angle from one side to a steering angle on the opposite side while traveling in a single direction is important, it is necessary to steer to the opposite side in order to bring the front portion of the vehicle into the parking space after the end portion of the vehicle has first entered the parking space. In order to select the appropriate timing for this steering switch, it is necessary to have an expected trajectory for the current steering angle and an expected trajectory for the opposite steering angle, both of which are in the same travel direction. Meanwhile, in opposite-direction reverse-steering, such as when backing out from a perpendicular parking space into a parking access route and then traveling forward, it is necessary to have an expected trajectory for the travel direction of the vehicle at the current steering angle and an expected trajectory for the opposite direction as the travel direction of the vehicle at the opposite steering angle. Accordingly, in a preferred embodiment of the present invention, the configuration is such that an expected trajectory in the travel direction of the vehicle is set as the reverse trajectory during same-direction reverse-steering travel, and an expected trajectory in the opposite direction as the travel direction of the vehicle is set as the reverse trajectory during opposite-direction reverse-steering travel.

Furthermore, in a preferred embodiment of the present invention, when turning while traveling in reverse, the forward trajectory setting unit sets, as the forward trajectory, an outer end expected trajectory line that is the trajectory of a front end portion on the outer side of the turning vehicle, a leading end expected trajectory line that is the trajectory of a rear end portion on the outer side of the turning vehicle, and an inner end expected trajectory line that is the trajectory of a rear end portion on the inner side of the turning vehicle, and when turning while traveling forward, sets, as the forward trajectory, the outer end expected trajectory line that is the trajectory of the front end portion on the outer side of the turning vehicle, the leading end expected trajectory line that is the trajectory of a front end portion on the inner side of the turning vehicle, and the inner end expected trajectory line that is the trajectory of the rear end portion on the inner side of the turning vehicle. According to this configuration, when, for example, turning while traveling in reverse in order to back out from a congested parking lot, expected trajectory lines are displayed for three end portions of the vehicle, or the front end portion on the outer side of the turning vehicle, the rear end portion on the outer side of the turning vehicle, and the rear end portion on the inner side of the turning vehicle, which are likely to make contact with other vehicles, obstructions, and so on. In addition, expected trajectory lines are displayed for three end portions of the vehicle, or the front end portion on the outer side of the turning vehicle, the front end portion on the inner side of the turning vehicle, and the rear end portion on the inner side of the turning vehicle, which are likely to make contact with other vehicles, obstructions, and so on when turning while traveling forward. Accordingly, the driver can easily determine the likelihood of making contact with other vehicles and/or obstructions from the expected trajectory lines that are based on the current position of the vehicle and the current steering angle.

If the forward trajectory and the reverse trajectory are displayed in the monitor in formats that are different from each other visually as a preferred embodiment of the present invention, the trajectory lines can be distinguished from each other in a small screen, which is favorable.

A large processing load is required in order to calculate and render the respective expected trajectories for each steering angle. Storing the forward trajectory in a trajectory image storage unit so as to be capable of being extracted by the forward trajectory setting unit as an expected trajectory line image prepared for each steering angle, and storing the reverse trajectory in the trajectory image storage unit so as to be capable of being extracted by the reverse trajectory setting unit as an expected trajectory line image for the maximum steering angle, is proposed as a way to avoid such an increase in the processing load. Through this, it is not necessary to generate images for the expected trajectory lines each time for synthesis with the vehicle periphery overhead image, and instead, the images of the appropriate expected trajectory lines can simply be extracted using the steering angle as a search condition.

The relationship between the vehicle and the vehicle periphery changes as the vehicle travels, and the shapes of the expected trajectories also change depending on the steering angle. Accordingly, in order to display the newest drive assist overhead image in the monitor, it is preferable to update and display the drive assist overhead image in the monitor each time the steering angle is changed to a predetermined angle or each time the vehicle travels a predetermined distance.

BRIEF DESCRIPTION OF THE DRAWINGS

FIG. 3 is a schematic diagram illustrating a relationship between trajectory lines when backing and turning left/right and when advancing and turning left/right.

FIG. 8 is a diagram illustrating monitor screens displaying drive assist display images when backing up in order to parallel park.

DESCRIPTION OF EMBODIMENTS

Figure 1:
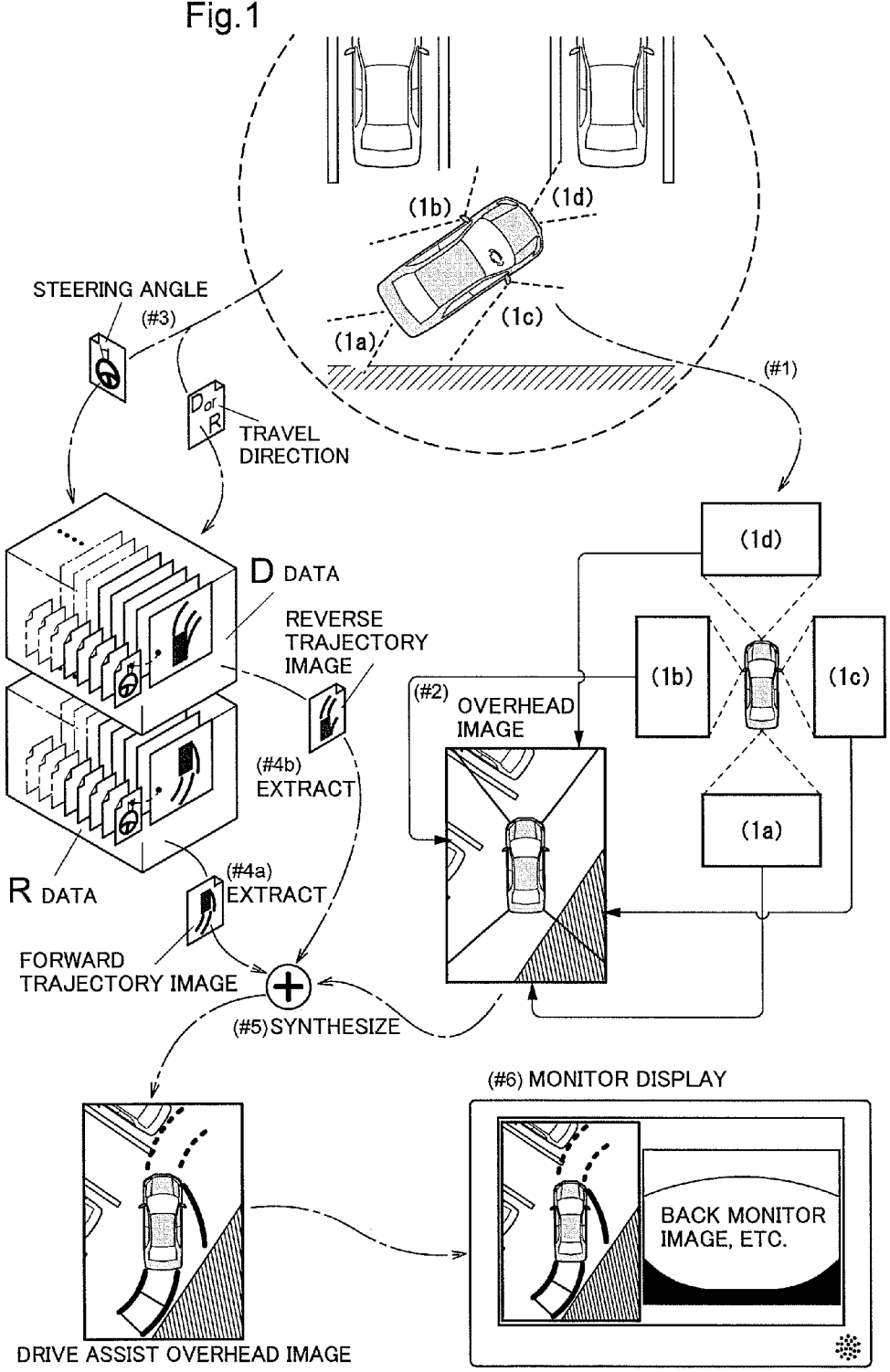
FIG. 1 is a schematic diagram illustrating principles, used by a drive assist device according to the present invention, for generating a drive assist overhead image that combines a forward trajectory and a reverse trajectory, serving as expected trajectory lines during turning, with an overhead image based on captured images.

First, the schematic diagram shown in FIG. 1 will be used to describe principles of generating a drive assist overhead image in which expected trajectory lines of end portions of a vehicle are incorporated into a vehicle periphery overhead image (often called simply an "overhead image" hereinafter) based on captured images, as used in a drive assist device according to the present invention. This example describes a situation in which a vehicle is turning left while backing out of a perpendicular parking space. The vehicle periphery is covered essentially without gaps by four captured images, indicated as (1a), (1b), (1c), and (1d), captured by vehicle-mounted cameras.

Drive assistance is commenced when the vehicle advances from a parking area such as a parking lot. First, the four captured images of the surrounding areas that enclose the vehicle are obtained by the vehicle-mounted cameras (#1). The obtained captured images are converted into an overhead image seen from a predetermined virtual overhead viewpoint through a viewpoint conversion process employing a mapping table, which itself is a known technique (#2). The travel direction at the point in time when the captured images are obtained (D for forward or R for reverse; here, reverse) and the steering angle of the steered wheels (here, the front wheels) are calculated (#3). Note that in the present invention, images of expected trajectory lines for the end portions of the vehicle are prepared in advance for different steering angles, for when turning while traveling in reverse and when turning while traveling forward.

Note that in the present invention, the expected trajectory lines of the end portions of the vehicle when turning while traveling in reverse include an outer end expected trajectory line corresponding to the trajectory of the front end of the vehicle on the outer side of the turning vehicle, a leading end expected trajectory line corresponding to the trajectory of the rear end of the vehicle on the outer side of the turning vehicle, and an inner end expected trajectory line corresponding to the trajectory of the rear end of the vehicle on the inner side of the turning vehicle. In addition, the expected trajectory lines of the end portions of the vehicle when turning while traveling forward include an outer end expected trajectory line corresponding to the trajectory of the front end of the vehicle on the outer side of the turning vehicle, a leading end expected trajectory line corresponding to the trajectory of the front end of the vehicle on the inner side of the turning vehicle, and an inner end expected trajectory line corresponding to the trajectory of the rear end of the vehicle on the inner side of the turning vehicle.

Two extraction conditions for extracting suitable expected trajectory lines of the end portions of the vehicle are generated from the travel direction (forward D or reverse R) and a calculated steering angle $\theta$ (here, $\theta$ is expressed as a signed angle value that takes 0 as a central position and is positive when steering to the left and negative when steering to the right). One condition is (1) a combination of "travel direction=R" for specifying a reverse turning expected trajectory data group and "steering angle=$\theta$" for selecting a reverse turning expected trajectory from the reverse turning expected trajectory data group as a forward trajectory image. The other condition is (2) a combination of "travel direction=D", corresponding to a reversal of the travel direction carried out as appropriate, and "steering angle=$-\theta$max", corresponding to the maximum steering angle in the opposite direction, serving as an opposite steering angle. In this example, the reverse turning expected trajectory lines that match the (1) extraction conditions, or the conditions based on "travel direction=R" and "steering angle=$\theta$", are extracted as a forward trajectory image (#4a). Furthermore, forward turning expected trajectory lines that match the (2) extraction conditions, or the conditions based on "travel direction=D" and "steering angle=$-\theta$max", are extracted as a reverse trajectory image (#4b).

The overhead image generated in step #2, the reverse turning expected trajectory lines extracted in step #4a, and the reverse turning expected trajectory lines extracted in step #4b are synthesized so that the vehicle position in the overhead image and the vehicle position in the reverse turning expected trajectory lines match, thus generating the drive assist overhead image for display in a monitor (#5). The generated drive assist overhead image is displayed in a monitor along with, for example, a rear monitor image that is a captured image of the vehicle's travel direction (#6).

Note that a reverse trajectory image favorable for determining the point where the direction of travel is switched is necessary when the vehicle is approaching the point where the direction of travel is switched. Accordingly, when employing a configuration in which the device is capable of recognizing that the point where the direction of travel is switched is approaching or in which the driver can manually specify that the point where the direction of travel is switched is approaching, the reverse trajectory image may be extracted at that time and displayed in the monitor. However, in the case where the apparatus cannot know that the point where the direction of travel is switched is approaching in this manner, the reverse trajectory image may be displayed in the monitor along with the forward trajectory image from the outset, or the reverse trajectory image may be displayed in the monitor after the vehicle has traveled a predetermined distance following the start of the driving assistance.

By repeating the aforementioned step #1 through step #6 each time the vehicle travels a predetermined distance or each time the steering angle is changed by a predetermined angle, the drive assist overhead image is updated as appropriate during the process for exiting from the perpendicular parking space, thus assisting the driver in his/her driving.

The process for exiting from a perpendicular parking space shown in FIG. 1 is an example of opposite-direction reverse-steering travel. A parking process carried out when parking parallel can be given as an example of same-direction reverse-steering travel. In this case, after the rear portion of the vehicle has backed into the parking space, the driver brings the front portion of the vehicle into the parking space at the opposite steering angle, while avoiding contact with another parked car in front of the vehicle; at this time, it is preferable to display at least the reverse trajectory image as the overhead image in the monitor.

Hereinafter, an embodiment of the present invention will be described based on the drawings. The present embodiment describes a drive assist device that employs, as a drive assist overhead image, an overhead image generated from captured images from cameras that capture a parking direction and left and right directions using a forward camera, left and right side cameras, and a rear camera provided on a vehicle, and trajectories of the end portions of the vehicle.

Figure 2:
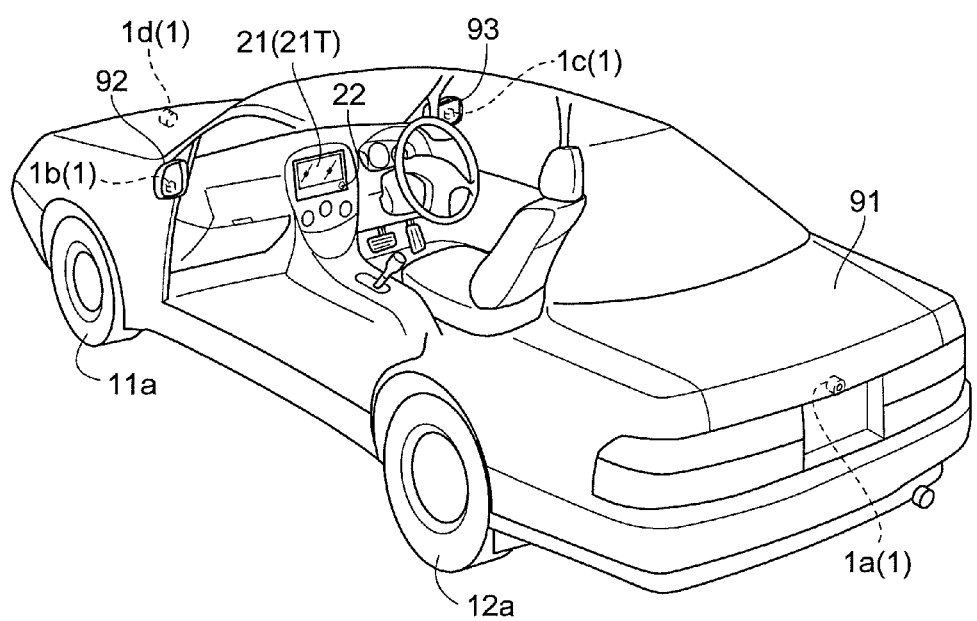
FIG. 2 is a perspective view of a vehicle in which the drive assist device according to the present invention, from which part of the vehicle has been cut away.

As shown in FIG. 2, this vehicle is configured so that left and right front wheels 11a and 11b serve as steered wheels and left and right rear wheels 12a and 12b serve as non-steered wheels. A rear camera 1a is provided on the rear end of the vehicle, or in other words, on a trunk door 91. A left side camera 1b is provided on a lower area of a left side mirror 92 on a left-front door, whereas a right side camera 1c is provided on a lower area of a right side mirror 93 on a right-front door. Furthermore, a forward camera 1d is provided on a front area of the vehicle. In the following descriptions, the cameras 1a through 1d will be collectively referred to as "cameras 1" (vehicle-mounted cameras) where appropriate.

The cameras 1 are digital cameras that employ image sensors such as CCDs (charge coupled devices) or CISs (CMOS image sensors), capture two-dimensional images at 15-30 frames per second, convert the images into digital images, and output the captured images in real time. The cameras 1 are configured with wide-angle lenses. Specifically, in the present embodiment, a view angle of 140-190° in the horizontal direction is provided. The rear camera 1*a* and the forward camera 1*d* are disposed on the vehicle having an angle of depression of approximately 30 degrees in the optical axis, and are thus capable of capturing a region up to approximately 8 m from the vehicle. The left side camera 1*b* and the right side camera 1*c* are disposed on the base areas of the side mirrors 92 and 93 with their optical axes facing downward, and take part of the side surface of the vehicle and the road surface (ground surface) as their subjects. During drive assistance when parking or leaving a parking space, the captured images from the cameras 1 and a drive assist image generated using those captured images are displayed in a monitor 21. Furthermore, parking guidance that employs audio based on a parking route extending from a parking starting point to a target parking space is outputted from a speaker 22. Confirmation of the parking space, other operational inputs, and so on are carried out through a touch panel 21 installed in the monitor 21.

This drive assist device displays expected trajectory lines of the vehicle end portions, which are particularly effective when turning while traveling forward and turning while traveling in reverse in order to park in a parking space in a parking lot or exit from a parking space; the expected trajectory lines will be described using FIG. 3.

FIG. 3 illustrates a left-side rear-end portion 2*a*, a right-side rear-end portion 2*b*, a left-side front-end portion 2*c*, and a right-side front-end portion 2*d*, corresponding to vehicle end portions (the four corner areas of the vehicle) that are highly likely to make contact with other cars, obstructions, or the like when turning while traveling.

In FIG. 3A, an outer end expected trajectory line R1 serving as the trajectory of the left-side front-end portion 2*c* that is the front end portion on the outer side of the turning vehicle, a leading end expected trajectory line R2 serving as the trajectory of the left-side rear-end portion 2*a* that is the rear end portion on the outer side of the turning vehicle, and an inner end expected trajectory line R3 serving as the trajectory of the right-side rear-end portion 2*b* that is the rear end portion on the inner side of the turning vehicle are defined as expected trajectory lines of the vehicle end portions that, in the present invention, are considered important when turning right while backing up.

In FIG. 3B, the outer end expected trajectory line R1 serving as the trajectory of the right-side front-end portion 2*d* that is the front end portion on the outer side of the turning vehicle, the leading end expected trajectory line R2 serving as the trajectory of the right-side rear-end portion 2*b* that is the rear end portion on the outer side of the turning vehicle, and the inner end expected trajectory line R3 serving as the trajectory of the left-side rear-end portion 2*a* that is the rear end portion on the inner side of the turning vehicle are defined as expected trajectory lines of the vehicle end portions that, in the present invention, are considered important when turning left while backing up.

In FIG. 3C, an outer end expected trajectory line D1 serving as the trajectory of the left-side front-end portion 2*c* that is the front end portion on the outer side of the turning vehicle, a leading end expected trajectory line D2 serving as the trajectory of the right-side rear-end portion 2*b* that is the rear end portion on the outer side of the turning vehicle, and an inner end expected trajectory line D3 serving as the trajectory of the right-side rear-end portion 2*b* that is the rear end portion on the inner side of the turning vehicle are defined as expected trajectory lines of the vehicle end portions that, in the present invention, are considered important when turning right while moving forward.

In FIG. 3D, the outer end expected trajectory line D1 serving as the trajectory of the right-side front-end portion 2*d* that is the front end portion on the outer side of the turning vehicle, the leading end expected trajectory line D2 serving as the trajectory of the left-side front-end portion 2*c* that is the rear end portion on the outer side of the turning vehicle, and the inner end expected trajectory line D3 serving as the trajectory of the left-side rear-end portion 2*a* that is the rear end portion on the inner side of the turning vehicle are defined as expected trajectory lines of the vehicle end portions that, in the present invention, are considered important when turning left while moving forward.

All of the aforementioned expected trajectory lines are functions, and have different shapes depending on the value of the steering angle. Furthermore, in this application, the vehicle travel direction when the steering angle is the maximum steering angle $-\theta max$ in the opposite direction as the calculated steering angle $\theta$, or the reverse trajectory as the expected trajectory when the vehicle is traveling forward, is called a "reverse trajectory". Conversely, the reverse trajectory of the previous expected trajectory is opposite to the aforementioned reverse trajectory and is thus called a "forward trajectory".

Figure 4:
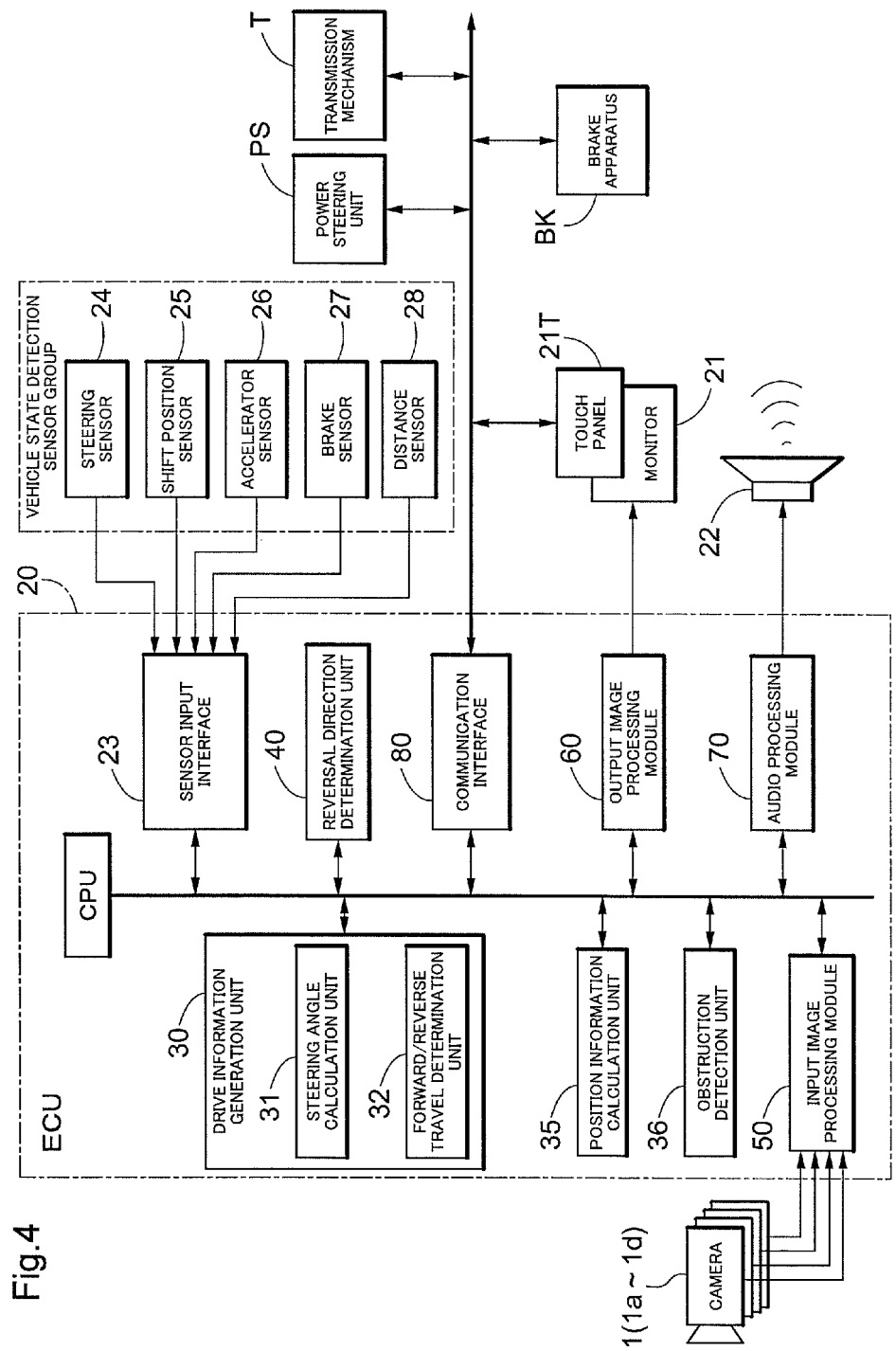
FIG. 4 is a functional block diagram schematically illustrating part of a vehicle control system including a drive assist control unit.

A drive assist control unit (called simply an "ECU" hereinafter) 20, serving as the core of the drive assist device according to the present invention, is disposed within the vehicle. As shown in FIG. 4, the ECU 20 includes a sensor input interface 23, a communication interface 80, and so on serving as input/output interfaces for inputting/outputting information, as well as a microprocessor, DSP (digital signal processor), and the like for processing information obtained via the input/output interfaces. Some or all of the input/output interfaces may be included in such processors as well.

A vehicle state detection sensor group for detecting driving operations, a state of movement, and the like is connected to the sensor input interface 23. The vehicle state detection sensor group includes a steering sensor 24 that measures a steering operation direction (steering direction) and operation amount (steering amount), a shift position sensor 25 that determines a shift position of a shift lever, an accelerator sensor 26 that measures an operation amount of an accelerator pedal, a brake sensor 27 that detects an operation amount of a brake pedal, a distance sensor 28 that detects a distance traveled by the vehicle, and so on.

Meanwhile, the communication interface 80 employs a vehicle-mounted LAN, and thus in addition to the touch panel 21T and the monitor 21, control units such as a power steering unit PS, a transmission mechanism T, and a brake apparatus BK are connected so as to be capable of transmitting data.

The ECU 20 is provided with a drive information generation unit 30, a position information calculation unit 35, an obstruction detection unit 36, an input image processing module 50, an output image processing module 60, and an audio processing module 70. The drive information generation unit 30, meanwhile, includes a steering angle calculation unit 31 and a forward/reverse travel determination unit 32. The steering angle calculation unit 31 calculates a signed (left/right direction) steering angle based on detection data of the steering direction and steering amount sent from the steering sensor 24. The forward/reverse travel determination unit 32 determines whether the vehicle is traveling in the forward direction or the reverse direction based on shift position detection data sent from the shift position sensor 25. The drive information generation unit 30 generates drive information including the steering angle calculated by the steering angle calculation unit 31 and the vehicle travel direction determined by the forward/reverse travel determination unit 32 and sends the generated information to the output image processing module 60 at a predetermined timing (a predetermined time, a predetermined distance traveled, or the like). A monitor display image generated by the output image processing module 60 is converted into a video signal by a display control unit (not shown) and sent to the monitor 21. Audio guidance for driving assistance, warning sounds in the event of an emergency, and the like generated by the audio processing module 70 are outputted from the speaker 22. The input image processing module 50 sends processed images obtained by processing the captured images from the cameras 1 to the output image processing module 60, other functional units that use those images, and so on.

The position information calculation unit 35 detects position information of the vehicle that changes as the vehicle moves. This process is carried out based on a vehicle movement amount obtained by the distance sensor 28, and the steering amount of a steering wheel 34 as measured by the steering sensor 24. Because the obstruction detection unit 36 is itself well-known, detailed descriptions thereof will be omitted; that being said, the obstruction detection unit 36 detects an object (an obstruction) present in the periphery of the vehicle using a distance calculating process and an image recognition process. For this reason, a plurality of ultrasound sensors (not shown here) are connected, and are disposed at both ends and in the center of each of the front portion, the rear portion, the left side portion, and the right side portion of the vehicle. Note that another type of object detecting sensor, such as a laser radar or the like, may be used instead of the ultrasound sensors. The obstruction detection unit 36 is capable not only of estimating the distance between the vehicle and an object, the size of the object, and the like by processing the return time, amplitude, and so on of reflected waves from each ultrasound sensor, but also of estimating movement in the object, the external shape of the object in the lateral direction thereof, and so on by processing the detection results from all of the ultrasound sensors over time. The obstruction detection unit 36 generates obstruction information regarding the presence of an obstruction in the vehicle periphery and sends the obstruction information to the output image processing module 60, the audio processing module 70, and the like.

Figure 5:
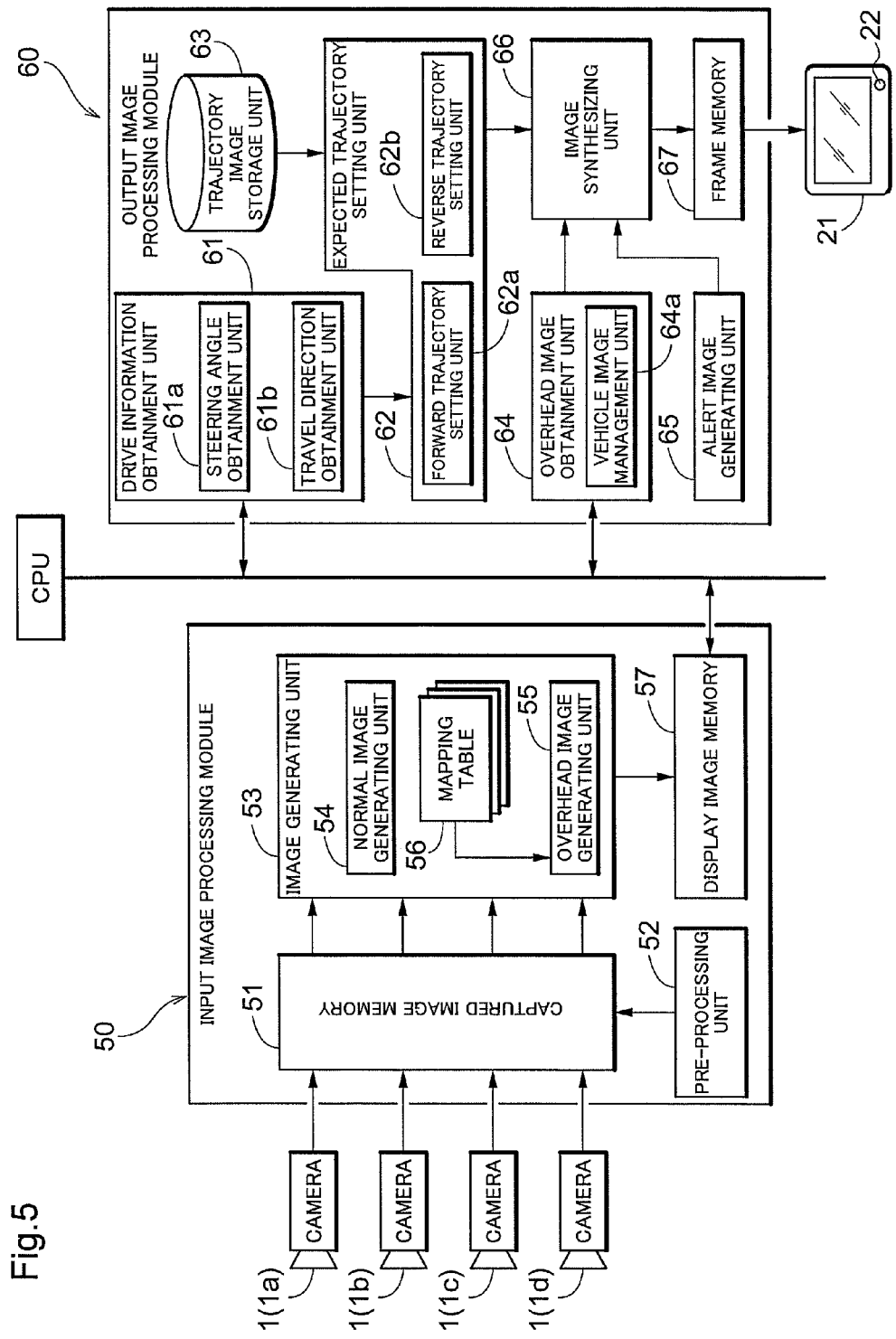
FIG. 5 is a functional block diagram illustrating an input image processing module and an output image processing module.

FIG. 5 illustrates a functional block diagram of the input image processing module 50 and the output image processing module 60 of the ECU 20. The input image processing module 50 has a function for generating a vehicle periphery overhead image (called simply an "overhead image" hereinafter) by performing viewpoint conversion that obtains a viewpoint from above the vehicle based on the captured images obtained by the cameras that capture images of the vehicle periphery. The output image processing module 60 generates the drive assist overhead image by combining the overhead image generated by the input image processing module 50 and the vehicle end portion expected trajectory lines defined as in FIG. 3, and displays the image in a predetermined display region of the monitor screen.

The input image processing module 50 includes a captured image memory 51, a pre-processing unit 52, an image generating unit 53, and a display image memory 57. The captured images obtained by the cameras 1 are expanded in the captured image memory 51, after which the pre-processing unit 52 adjusts the luminance balance, color balance, and so on between the individual captured images obtained by the four cameras 1a through 1d, and divides the images with appropriate image border lines. The image generating unit 53 includes a normal image generating unit 54, an overhead image generating unit 55, and a mapping table 56. The normal image generating unit 54 adjusts the captured images to an image quality suitable for directly displaying those images in the monitor as vehicle periphery images. The vehicle periphery images displayed in the monitor are independent for each of the cameras 1a through 1d, and can be selected as desired for display in the monitor.

Figure 6:
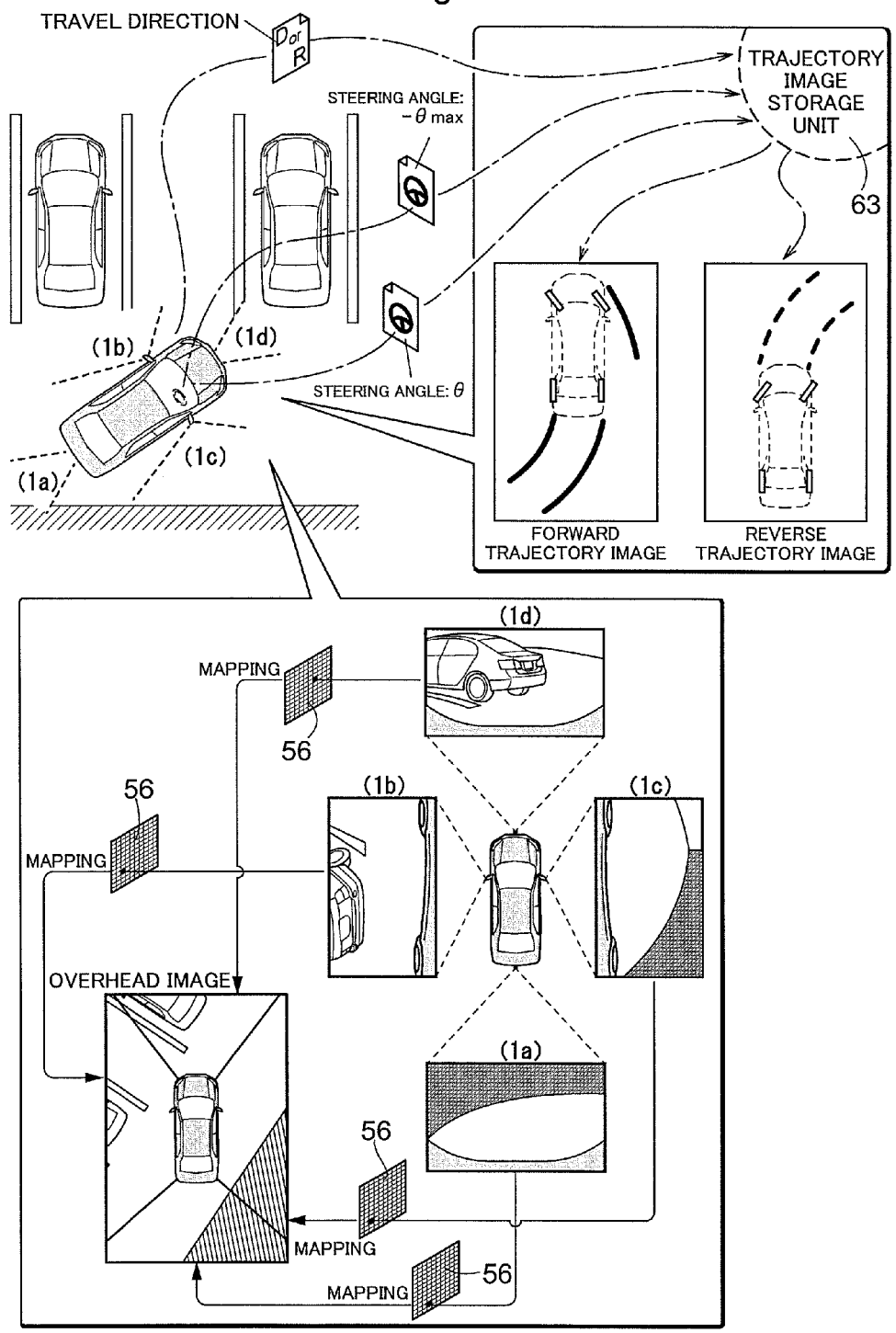
FIG. 6 is a schematic diagram schematically illustrating the generation of a surrounding overhead image from captured images and the extraction of a forward trajectory image and a reverse trajectory image based on a steering angle.

The overhead image generating unit 55 converts the captured image expanded in the captured image memory 51 into the overhead image that views the vehicle periphery from above based on conversion information recorded in the mapping table 56 and stores the overhead image in the display image memory 57. While the mapping table 56 can be constructed in various forms, it is preferable to construct the mapping table 56 as a table that denotes correspondence relationships between pixel data in the captured images and pixel data in the overhead image, and denotes destination pixel coordinates in the overhead image for each pixel in each frame of the captured images. FIG. 6 schematically illustrates the conversion of four captured images into the overhead image during perpendicular parking. The rear captured images from the rear camera 1a are coordinate-converted, through the mapping 56, into a rear area image for the overhead image. The forward captured images from the forward camera 1d are coordinate-converted, through the mapping 56, into a forward area image for the overhead image. The left-side captured images from the left side camera 1b are coordinate-converted, through the mapping 56, into a left area image for the overhead image. The right-side captured images from the right side camera 1c are coordinate-converted, through the mapping table 56, into a right area image for the overhead image. Accordingly, the mapping table 56 includes four different overhead image mapping tables for converting the captured images from the respective cameras into the overhead image.

The output image processing module 60 includes a drive information obtainment unit 61, an expected trajectory line setting unit 62, a trajectory image storage unit 63, an overhead image obtainment unit 64 that has a vehicle image management unit 64a, an alert image generating unit 65, an image synthesizing unit 66, and a frame memory 67.

The drive information obtainment unit 61 further includes a steering angle obtainment unit 61a and a travel direction obtainment unit 61b. The steering angle obtainment unit 61a reads the current steering angle of the vehicle from received drive information, and the travel direction obtainment unit 61b reads the current travel direction of the vehicle.

The expected trajectory line setting unit 62 can determine whether the vehicle is turning while traveling in reverse or turning while traveling forward based on the steering angle and travel direction obtained by the drive information obtainment unit 61, and can therefore extract suitable vehicle end portion trajectory lines from the trajectory image storage unit 63. The extracted vehicle end portion trajectory lines are displayed in the monitor along with the overhead image generated by the overhead image generating unit 55. The expected trajectory line setting unit 62 includes a forward trajectory setting unit 62a and a reverse trajectory setting unit 62b.

In the case where it has been determined that the vehicle is turning while traveling in reverse during driving assistance, the forward trajectory setting unit 62a extracts, as the forward trajectory image, the outer end expected trajectory line R1 that is the trajectory of the front end portion on the outer side of the turning vehicle, the leading end expected trajectory line R2 that is the trajectory of the rear end portion on the outer side of the turning vehicle, and the inner end expected trajectory line R3 that is the trajectory of the rear end portion on the inner side of the turning vehicle, obtained when turning while traveling in reverse at the obtained steering angle of θ. The reverse trajectory setting unit 62*b* extracts the reverse trajectory image as described below. That is, when it has been confirmed from the drive information that the vehicle is undergoing same-direction reverse-steering travel, the reverse trajectory setting unit 62*b* extracts, as the reverse trajectory image, the outer end expected trajectory line R1 that is the trajectory of the front end portion on the outer side of the turning vehicle, the leading end expected trajectory line R2 that is the trajectory of the rear end portion on the outer side of the turning vehicle, and the inner end expected trajectory line R3 that is the trajectory of the rear end portion on the inner side of the turning vehicle, when the vehicle is turning while traveling in reverse at the maximum steering angle −θmax in the opposite direction as the obtained steering angle θ. In addition, when it has been confirmed from the drive information that the vehicle is undergoing opposite-direction reverse-steering travel, the reverse trajectory setting unit 62*b* extracts, as the reverse trajectory image, the outer end expected trajectory line D1 that is the trajectory of the front end portion on the outer side of the turning vehicle, the leading end expected trajectory line D2 that is the trajectory of the rear end portion on the outer side of the turning vehicle, and the inner end expected trajectory line D3 that is the trajectory of the rear end portion on the inner side of the turning vehicle, when the vehicle is turning while traveling forward at the maximum steering angle −θmax in the opposite direction as the obtained steering angle θ. In the case where the direction of travel after turning cannot be confirmed, it is preferably to extract the reverse trajectory images for both the left and right directions and display the images in the monitor.

Meanwhile, in the case where it has been determined that the vehicle is turning while traveling in reverse during driving assistance, the forward trajectory setting unit 62*a* extracts, as the forward trajectory image, the outer end expected trajectory line D1 that is the trajectory of the front end portion on the outer side of the turning vehicle, the leading end expected trajectory line D2, and the inner end expected trajectory line D3 that is the trajectory of the rear end portion on the inner side of the turning vehicle, obtained when turning while traveling forward at the obtained steering angle of θ. Likewise, the reverse trajectory setting unit 62*b* extracts the reverse trajectory images when the vehicle is turning while traveling forward, turning while traveling in reverse, or both.

In this embodiment, the outer end expected trajectory line R1, the leading end expected trajectory line R2, and the inner end expected trajectory line R3 when the vehicle is turning while traveling in reverse, and the outer end expected trajectory line D1, the leading end expected trajectory line D2, and the inner end expected trajectory line D3 when the vehicle is turning while traveling forward are stored in the trajectory image storage unit 63 as expected trajectory line images, prepared in advance for each of predetermined steering angle units, that are synthesized with the overhead image generated by the overhead image generating unit 55. Note that the forward trajectory images and reverse trajectory images are displayed in visually different forms in the monitor, and thus it is preferable to prepare the expected trajectory lines for the maximum steering angle individually for the forward trajectory images and the reverse trajectory images, and enable the images to be distinguished from each other as solid lines and dotted lines, opaque lines and transparent lines, different colored lines, and so on, respectively.

Accordingly, the expected trajectory line setting unit 62 that includes the forward trajectory setting unit 62*a* and the reverse trajectory setting unit 62*b* can, as shown schematically in FIG. 6, extract the appropriate forward trajectory image and reverse trajectory image from the trajectory image storage unit 63 based on the current steering angle θ and the travel direction D or R. The extracted forward trajectory image and reverse trajectory image can be synthesized with the overhead image generated from the captured images from the four cameras 1, and can then be displayed in the monitor.

The overhead image obtainment unit 64 obtains the current overhead image generated by the overhead image generating unit 55, and inserts a vehicle image prepared by the vehicle image management unit 64*a* in a predetermined position, typically the center, of the overhead image. Note that in the case where the vehicle image is incorporated into the expected trajectory line image in advance, the vehicle image management unit 64*a* is not necessary.

The image synthesizing unit 66 generates the drive assist display image by synthesizing the forward trajectory image prepared by the expected trajectory line setting unit 62, and in some cases the forward trajectory image and the reverse trajectory image, with the overhead image prepared by the overhead image obtainment unit 64 so that the virtual vehicle positions in the respective images match each other. More specifically, the outer end expected trajectory lines R1 and D1, the leading end expected trajectory lines R2 and D2, and the inner end expected trajectory lines R3 and D3 are synthesized with the overhead image so that corresponding end portions in the vehicle image (portions corresponding to the actual vehicle end portions 2*a*, 2*b*, 2*c*, and 2*d*) serve as departure points. During this synthesis, an alert image, in which alert information such as a parking guidance message is realized as an image by the alert image generating unit 65, can be additionally synthesized as well.

Note that the following cases can be given as display formats in which the corresponding end portions in the vehicle image serve as departure points: a case where the corresponding end portions in the vehicle image match with ends of the trajectory lines R1, D1, R2, D2, R3, and D3; and a case where the corresponding end portions in the vehicle image and the ends of the trajectory lines R1, D1, R2, D2, R3, and D3 are separate from but close to each other so that the correspondence relationship between the corresponding end portions in the vehicle image and the ends of the trajectory lines R1, D1, R2, D2, R3, and D3 can be understood.

Figure 7:
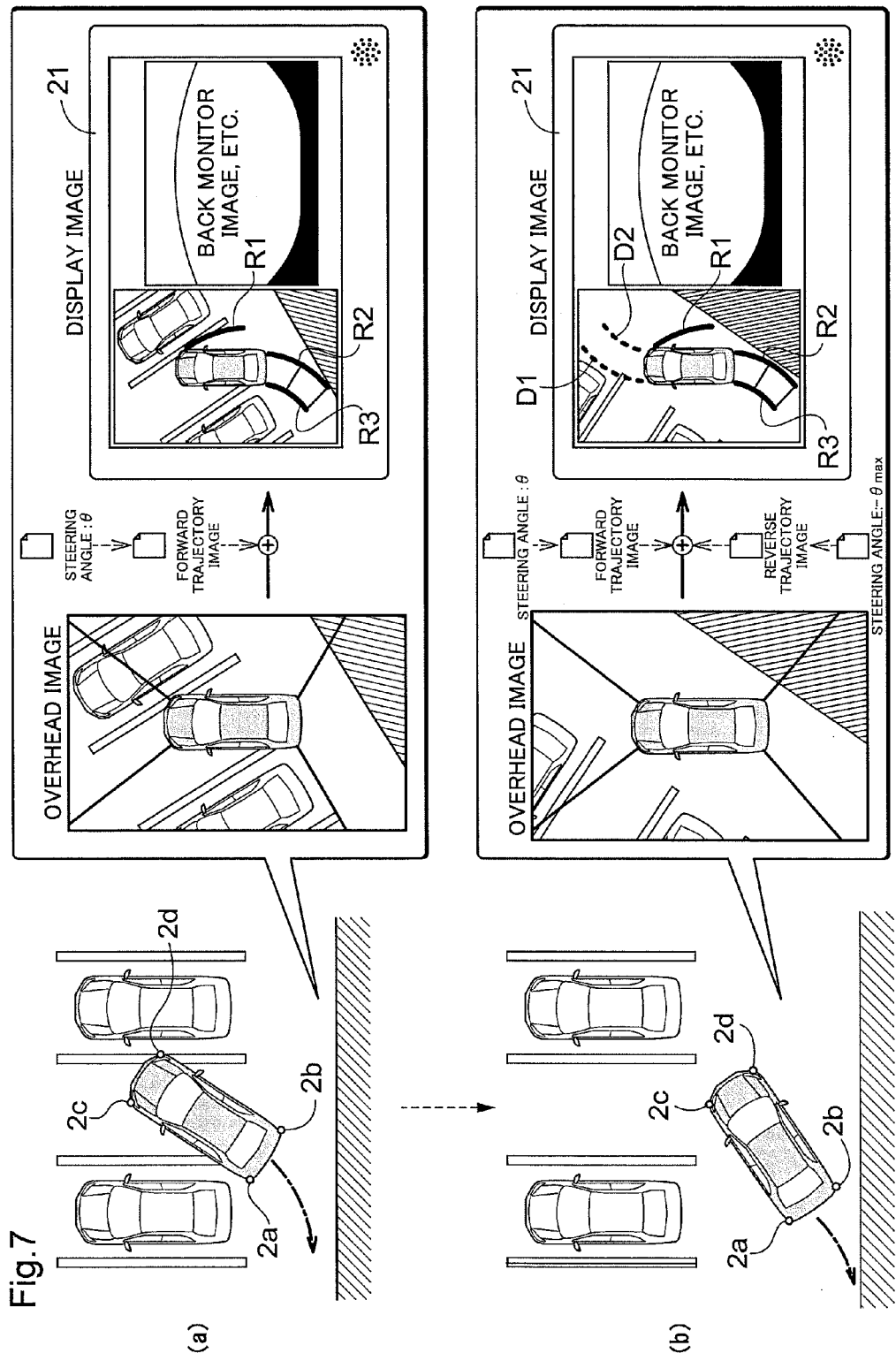
FIG. 7 is a diagram illustrating monitor screens displaying drive assist display images when backing out of a perpendicular parking space.

FIG. 7 illustrates an example of a drive assist display image indicating a reverse departure process that includes opposite-direction reverse-steering travel, or backing up, switching the direction of travel, and traveling forward; that is, here, a perpendicularly-parked vehicle exits the parking space in reverse, switches to the forward direction, and then returns to the parking access route. In this monitor screen, the drive assist display image is arranged horizontally next to a back monitor image, which is the image captured by the rear camera 1*a*. The outer end expected trajectory line R1, the leading end expected trajectory line R2, and the inner end expected trajectory line R3 are included, as forward trajectory images, in the drive assist display image according to this embodiment. Furthermore, the outer end expected trajectory line D1 and the leading end expected trajectory line D2 are included as reverse trajectory images at least when traveling after reversing directions. Through this, the driver can easily recognize the likelihood of contact with an obstruction such as another vehicle, a wall, or the like that is adjacent to the vehicle at the current steering angle, particularly when reversing directions. Although a wall to the rear can be confirmed using the back monitor screen and other parked vehicles visible in the front can be visually confirmed, the distance therebetween is difficult to grasp, and it is thus difficult for typical drivers to determine the likelihood of making contact at the current steering angle.

In the state shown in FIG. 7(a) (a steering angle θ), which is the initial stage of a reverse departure process, the drive assist display image indicates, through the leading end expected trajectory line R2, that there is a likelihood that the right-side rear-end portion 2b of the vehicle will make contact with an obstruction (a wall). Accordingly, the driver increases the steering angle as necessary while carefully steering the vehicle. The forward trajectory image is updated each time the steering angle is changed, and thus the driver can back up while confirming, using the drive assist display image, that the vehicle will not make contact with a wall or an adjacent vehicle.

The state in FIG. 7(b) is reached when the vehicle has continued to back up and it has been recognized, based on driving circumstances such as the distance traveled or based on a manual setting made by the driver, that an area corresponding to the point where the direction of travel is switched has been reached. In the state shown in FIG. 7(b), the forward trajectory image for the steering angle θ at that time is displayed along with the reverse trajectory image for the steering angle −θmax, and thus the likelihood that the right-side front-end portion 2c of the vehicle will make contact with another parked vehicle can be confirmed through the forward outer end expected trajectory line D1. The vehicle can perform opposite-direction reverse-steering travel in a smooth manner by backing to a position at which the right-side front-end portion 2c does not make contact with another parked vehicle, turning the steering wheel all the way to the opposite side, and advancing forward.

Although FIG. 7 illustrates the usefulness of the drive assist display image according to the present invention in a reverse departure process in which the vehicle leaves a perpendicular parking space through opposite-direction reverse-steering travel, it is clear from the drawings that the drive assist display image according to the present invention is also useful in a forward parking process in which the vehicle parks perpendicularly from a parking access route through opposite-direction reverse-steering travel.

FIG. 8 illustrates an example of a drive assist display image during a reverse parking process that includes same-direction reverse-steering travel in order to parallel-park. In this monitor screen as well, the drive assist display image is arranged horizontally next to a back monitor image, which is the image captured by the rear camera 1a.

In the state shown in FIG. 8A (a steering angle θ), which is the initial stage of a reverse departure process, the drive assist display image indicates, through the inner end expected trajectory line R3, that there is a likelihood that the left-side rear-end portion 2a of the vehicle will first make contact with a parked vehicle and then with an obstruction (a wall). Accordingly, the driver increases the steering angle as necessary while carefully steering the vehicle. The forward trajectory image is updated each time the steering angle is changed, and thus the driver can back up while confirming, using the drive assist display image, that the vehicle will not make contact with a wall or an adjacent vehicle.

The state in FIG. 8B is reached when the vehicle has continued to back up and it has been recognized, based on driving circumstances such as the distance traveled or based on a manual setting made by the driver, that an area corresponding to the point where the direction of travel is switched has been reached. In the state shown in FIG. 8B, the forward trajectory image for the steering angle a at that time is displayed along with the reverse trajectory image for the steering angle −θmax, and thus the likelihood that the right-side front-end portion 2c of the vehicle will make contact with another parked vehicle can be confirmed through the reverse outer end expected trajectory line R1, which is indicated by a dotted line serving as the reverse trajectory image. Furthermore, the likelihood that the left-side rear-end portion 2a of the vehicle will make contact with an obstruction (a wall) can be confirmed through the reverse leading end expected trajectory line R2, while the likelihood that the right-side rear-end portion 2b of the vehicle will make contact with a parked vehicle in the rear can be confirmed through the reverse inner end expected trajectory line R3.

Other Embodiments (1) Although the aforementioned embodiment describes the forward trajectory image as being displayed in the monitor as the three trajectory lines, or the outer end expected trajectory line R1 or D1, the leading end expected trajectory line R2 or D2, and the inner end expected trajectory line R3 or D3, one or two of these may be omitted. In addition, the transparency thereof may be adjusted so that one or two of the line is not displayed in the monitor as desired. Likewise, the reverse trajectory image may also be displayed as one or two trajectory lines.

(2) Although not shown in the drawings used to illustrate the embodiment, the outer end expected trajectory lines R1 and D1, the leading end expected trajectory lines R2 and D2, and the inner end expected trajectory lines R3 and D3 can be displayed in the monitor in different formats, for example as different line types, such as solid lines and dotted lines, or in different colors.

(3) To make the expected trajectories indicated by the outer end expected trajectory lines R1 and D1, the leading end expected trajectory lines R2 and D2, and the inner end expected trajectory lines R3 and D3 clear, a configuration in which a region enclosed by two of the outer end expected trajectory lines, the leading end expected trajectory lines, and the inner end expected trajectory line is filled in with a color to indicate a vehicle expected trajectory surface can be favorably employed as well. In addition, it is also possible to generate a plurality of filled surfaces and create the display using the different patterns, colors, or the like.

(4) Although the obstruction information from the obstruction detection unit 36 is used for the alert image, a configuration in which at that time, the alert image generating unit 65 generates, as the alert image, an obstruction image incorporated into the drive assist overhead image based on the obstruction information is favorable as well. In this case, the alert image generating unit 65 functions as an obstruction image generating unit.

(5) Although the aforementioned embodiment describes the reverse trajectory image as being based on the maximum steering angle in the opposite direction, the present invention is not limited thereto, and any given steering angle can be employed for the reverse trajectory image instead of the maximum steering angle as long as the steering angle is in the opposite direction. Depending on the driver, there may be cases where the operation for reversing the steering after backing up should be kept to a minimum. In addition, even if the maximum steering angle is used, this does not necessarily indicate a strict angle, and also includes angles close to the maximum steering angle.

Industrial Applicability

The present invention can be used in drive assist devices that assist driving operations performed by a driver by displaying an overhead image for enabling the driver to recognize a state in the periphery of his/her vehicle when parking.

DESCRIPTION OF REFERENCE SIGNS

1: camera
30: drive information generation unit
31: steering angle calculation unit
32: forward/reverse travel determination unit
35: position information calculation unit
36: obstruction detection unit
50: input image processing module
51: captured image memory
53: image generating unit
57: display image memory
60: output image processing module
61: drive information obtainment unit
61a: steering angle obtainment unit
61b: travel direction obtainment unit
62: expected trajectory line setting unit
62a: forward trajectory line setting unit
62b: reverse trajectory line setting unit
63: trajectory image storage unit
64: overhead image obtainment unit
64a: vehicle image management unit
65: alert image generating unit
66: image synthesizing unit

The invention claimed is:

1. A drive assist device comprising:
an overhead image generating unit that generates a vehicle periphery overhead image as a display image of the periphery of a vehicle displayed in a monitor, by performing viewpoint conversion from a captured image obtained by a camera that captures the periphery of the vehicle;
a steering angle calculation unit that calculates a steering angle of the vehicle;
a forward trajectory setting unit that sets a forward trajectory serving as an expected trajectory in the travel direction of the vehicle when turning based on the calculated steering angle calculated by the steering angle calculation unit;
a reverse trajectory setting unit that sets a reverse trajectory serving as an expected trajectory in the travel direction of the vehicle or the opposite direction as the travel direction of the vehicle when turning based on a steering angle in the opposite direction as the calculated steering angle; and
an image synthesizing unit that generates a drive assist overhead image for display in a monitor by synthesizing the forward trajectory and the reverse trajectory with the vehicle periphery overhead image, so that a vehicle image in the vehicle periphery overhead image serves as a departure point,
wherein an expected trajectory in the travel direction of the vehicle is set as the reverse trajectory during same-direction reverse-steering travel in which the steering angle is switched from one side to the opposite side while the vehicle is traveling in a single direction, and
an expected trajectory in the opposite direction as the travel direction of the vehicle is set as the reverse trajectory during opposite-direction reverse-steering travel in which the steering angle is switched from one side to the opposite side while the vehicle is traveling in the opposite direction to the current traveling direction.

2. The drive assist device according to claim 1,
wherein the steering angle in the opposite direction is the maximum steering angle in the opposite direction.

3. The drive assist device according to claim 1,
wherein when turning while traveling in reverse, the forward trajectory setting unit sets, as the forward trajectory, an outer end expected trajectory line that is the trajectory of a front end portion on the outer side of the turning vehicle, a leading end expected trajectory line that is the trajectory of a rear end portion on the outer side of the turning vehicle, and an inner end expected trajectory line that is the trajectory of a rear end portion on the inner side of the turning vehicle, and when turning while traveling forward, sets, as the forward trajectory, the outer end expected trajectory line that is the trajectory of the front end portion on the outer side of the turning vehicle, the leading end expected trajectory line that is the trajectory of a front end portion on the inner side of the turning vehicle, and the inner end expected trajectory line that is the trajectory of the rear end portion on the inner side of the turning vehicle.

4. The drive assist device according to claim 1,
wherein the forward trajectory and the reverse trajectory are displayed in the monitor in formats that are different from each other visually.

5. The drive assist device according to claim 1,
wherein the forward trajectory is stored in a trajectory image storage unit so as to be capable of being extracted by the forward trajectory setting unit as an expected trajectory line image prepared for each steering angle, and the reverse trajectory is stored in the trajectory image storage unit so as to be capable of being extracted by the reverse trajectory setting unit as an expected trajectory line image for the maximum steering angle.

6. The drive assist device according to claim 1,
wherein the drive assist overhead image is updated and displayed in the monitor each time the steering angle is changed to a predetermined angle or each time the vehicle travels a predetermined distance.

7. The drive assist device according to claim 1,
wherein during same-direction reverse-steering travel, the reverse trajectory setting unit sets, as the reverse trajectory image, the outer end expected trajectory line that is the trajectory of the front end portion on the outer side of the turning vehicle, the leading end expected trajectory line that is the trajectory of the rear end portion on the outer side of the turning vehicle, and the inner side expected trajectory line that is the trajectory of the rear end portion on the inner side of the turning vehicle, occurring when turning while traveling in reverse at a maximum steering angle -θmax in the opposite direction as an obtained steering angle θ; and
during opposite-direction reverse-steering travel, the reverse trajectory setting unit sets, as the reverse trajectory image, an outer end expected trajectory line D1 that is the trajectory of the front end portion on the outer side of the turning vehicle, a leading end expected trajectory line D2 that is the trajectory of the rear end portion on the outer side of the turning vehicle, and an inner end expected trajectory line D3 that is the trajectory of the rear end portion on the inner side of the turning vehicle, occurring when turning while traveling forward at a maximum steering angle -θmax in the opposite direction as an obtained steering angle θ.

8. The drive assist device according to claim 7, wherein in the case where the direction into which travel has been reversed cannot be confirmed, the reverse trajectory setting unit displays the reverse trajectory image for both of the directions.

\* \* \* \* \*